Patented June 15, 1948

2,443,504

UNITED STATES PATENT OFFICE 2,443,504

PREPARATION OF β,β'-DICYANODIETHYL CYANAMIDE

Ingenuin Hechenbleikner, Stamford, Conn., assignor to American Cyanamid Company, New York, N. Y., a corporation of Maine No Drawing. Application July 19, 1944, Serial No. 545,727

4 Claims. (Cl. 260—464)

The present invention relates to a method of preparing β,β'-dicyanodiethyl cyanamide, a compound which is useful as an intermediate in the preparation of corresponding amines, amides, acids, and esters which may be utilized in the fields of resins and insecticides.

It has been discovered that the above disubstituted cyanamide may be prepared by reacting acrylonitrile with cyanamide in the presence of an alkaline condensing agent or catalyst.

Among the alkaline condensing agents which may be employed for promoting the reaction are the alkali metal alcoholates of the low molecular weight aliphatic alcohols, such as sodium methylate, sodium ethylate, and potassium ethylate; trialkyl amines, such as triethyl amine, trimethyl amine and tri-n-butyl amine; hydroxides and oxides of the alkali-forming metals such as caustic potash, caustic soda and lime, or quaternary ammonium hydroxides such as, for example, triethyl benzyl ammonium hydroxide, trimethyl benzyl ammonium hydroxide and dodecyl dimethyl benzyl ammonium hydroxide.

The quantity of the condensing agent required is relatively small, and usually of the order of .005 to 1% of the combined weight of the reactants.

The reaction is preferably performed in the presence of an inert solvent or suspending agent, such as water, dioxane, benzene, toluene, etc.

In effecting the reaction it is usually most convenient to add the condensing agent to the cyanamide, the latter being dissolved or suspended in the inert liquid, and then slowly add said mixture to the acrylonitrile.

Example 10 cc. of 20% aqueous sodium hydroxide solution were added to a 22% aqueous solution of cyanamide, the latter containing 42 grams (1 mol) of cyanamide. This mixture was added dropwise to 212 grams (4 mols) of acrylonitrile heated to reflux in a one liter three-neck flask equipped with a condenser, stirrer and thermometer. When the addition was completed, the excess acrylonitrile and the water were removed by distillation under reduced pressure (15 mm). The residue solidified to a crystalline solid. After recrystallization from water, the β,β'-dicyanodiethyl cyanamide was obtained as a flaky, white solid having a melting point of 54° C. The yield was 145 grams (98% of theory).

The present invention provides a simple and convenient method of preparing the compound in good yield and of high purity.

While the invention has been described with particular reference to specific embodiments, it is to be understood that it is not to be limited thereto, but is to be construed broadly and restricted solely by the scope of the appended claims.

I claim:

1. A method of preparing β,β'-dicyanodiethyl cyanamide which includes the step of reacting acrylonitrile with cyanamide in the presence of an alkaline catalyst.

2. The method of claim 1 in which the catalyst is sodium hydroxide.

3. The method of claim 1 in which the catalyst is present in the proportion of from .005 to 1% of the combined weight of the reactants.

4. The method of claim 1 in which the reaction is carried out in a liquid medium inert to the reactants.

INGENUIN HECHENBLEIKNER.

REFERENCES CITED

The following references are of record in the file of this patent:

UNITED STATES PATENTS

| Number | Name | Date |
| --- | --- | --- |
| 1,992,615 | Hoffmann | Feb. 26, 1935 |
| 2,166,600 | Leupold et al. | July 18, 1939 |
| 2,195,974 | Reppe et al. | Apr. 2, 1940 |
| 2,249,135 | Hechenbleikner | July 15, 1941 |
| 2,280,790 | Bruson | Apr. 28, 1942 |